United States Patent
Lee

(10) Patent No.: US 10,557,514 B2
(45) Date of Patent: Feb. 11, 2020

(54) SUSPENSION SYSTEM FOR VEHICLE

(71) Applicant: Hyundai Mobis Co., Ltd., Seoul (KR)

(72) Inventor: Seung Chul Lee, Yongin-si (KR)

(73) Assignee: HYUNDAI MOBIS Co., Ltd., Seoul (KR)

( * ) Notice: Subject to any disclaimer, the term of this patent is extended or adjusted under 35 U.S.C. 154(b) by 22 days.

(21) Appl. No.: 15/839,311

(22) Filed: Dec. 12, 2017

(65) Prior Publication Data

US 2018/0163811 A1   Jun. 14, 2018

(30) Foreign Application Priority Data

Dec. 13, 2016   (KR) .................. 10-2016-0169221

(51) Int. Cl.
*F16F 9/36*   (2006.01)
*B60G 15/12*   (2006.01)
*F16F 9/02*   (2006.01)
*F16F 9/54*   (2006.01)

(52) U.S. Cl.
CPC .............. *F16F 9/369* (2013.01); *B60G 15/12* (2013.01); *F16F 9/02* (2013.01); *F16F 9/54* (2013.01); *B60G 2202/314* (2013.01); *B60G 2204/128* (2013.01); *F16F 2230/30* (2013.01)

(58) Field of Classification Search
CPC .... F16F 9/05; F16F 15/10; F16F 15/08; F16F 5/00; F16F 9/369; F16F 9/02; F16F 9/32; F16F 9/54; F16F 2230/30; B60G 15/12; B60G 2202/314; B60G 2204/128; B60G 13/003

USPC .................................. 267/220; 280/124.155
See application file for complete search history.

(56) References Cited

U.S. PATENT DOCUMENTS

| | | | |
|---|---|---|---|
| 7,311,181 B2 * | 12/2007 | Germano | B60G 13/003 188/321.11 |
| 7,938,418 B1 * | 5/2011 | Coombs | B60G 15/068 267/220 |
| 8,376,327 B2 | 2/2013 | Lee et al. | |
| 2002/0113398 A1 * | 8/2002 | Berner | B60G 11/16 280/124.155 |
| 2010/0237549 A1 * | 9/2010 | Jeischik | B60G 15/14 267/122 |
| 2013/0168941 A1 * | 7/2013 | Takagi | B60G 15/067 280/124.116 |

FOREIGN PATENT DOCUMENTS

KR   10-0917557   9/2009

* cited by examiner

*Primary Examiner* — Melanie Torres Williams
(74) *Attorney, Agent, or Firm* — H.C. Park & Associates, PLC

(57) ABSTRACT

A suspension system for a vehicle includes a housing; a damper part disposed within the housing and to extend through the housing; a transfer part surrounding the damper part and coupled to the damper part; a damper mount coupled to the transfer part, and disposed between an inner wall of the housing and the transfer part and configured to absorb vibration of the transfer part; a fixing part stacked over the damper mount and fixed to the inner wall of the housing; and an anti-leakage part coupled to the fixing part and configured to prevent an air leakage between the fixing part and the damper mount.

14 Claims, 3 Drawing Sheets

SUSPENSION SYSTEM FOR VEHICLE

CROSS-REFERENCES TO RELATED APPLICATION

This application claims priority from and the benefit of Korean Patent Application No. 10-2016-0169221, filed on Dec. 13, 2016, which is hereby incorporated by reference for all purposes as if fully set forth herein.

BACKGROUND

Field

Exemplary embodiments relate to a suspension system for a vehicle, and more particularly, to a suspension system for a vehicle, which may be easily assembled and disassembled, and prevent an air leakage from the suspension system.

In general, a suspension system for a vehicle connects an axle and a vehicle body, and properly attenuates vibration or impact transmitted from the road surface via vehicle wheels and applied to the axle during driving, thereby providing a comfortable ride to a passenger while preventing damage to the vehicle body.

The suspension system for a vehicle may provide flexibility in the vertical direction of the vehicle such that the vehicle may travel on an uneven road while the vehicle body is not affected by the unevenness of the road. Furthermore, the suspension system may suppress rolling of the vehicle body while responding to horizontal and lateral forces and braking and driving forces which are generated by wheels of the vehicle.

In a conventional suspension system, an anti-leakage part is disposed under a damper mount, which makes it complicated to disassemble and assemble an upper assembly of the suspension system.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments are directed to a suspension system for a vehicle, which may be easily disassembled and assembled because an anti-leakage part is disposed over a damper mount to prevent air leakage.

An exemplary embodiment discloses a suspension system for a vehicle, including: a housing; a damper part disposed through the housing; a transfer part surrounding the damper part and coupled to the damper part; a damper mount coupled to the transfer part and disposed between an inner wall of the housing and the transfer part, and configured to absorb vibration of the transfer part; a fixing part stacked over the damper mount and fixed to the inner wall of the housing; and an anti-leakage part coupled to the fixing part and configured to prevent air leakage between the fixing part and the damper mount.

The fixing part may include: a lower fixing part stacked over the damper mount, such that an end of the anti-leakage part is disposed on the lower fixing part; and an upper fixing part stacked over the lower fixing part so as to fix the anti-leakage part.

The anti-leakage part may include: a center bottom part having a through-hole through which a damper part is passed, and disposed on the top of the transfer part; an edge part disposed between the lower fixing part and the upper fixing part; and a protrusion part connecting the center bottom part and the edge part, and protruding upward along a circumferential direction.

The edge part of the anti-leakage part may include an edge protrusion protruding downward, and the lower fixing part may include a first groove formed at the top surface thereof, such that the edge protrusion is disposed in the first groove.

The edge protrusion may be extended in the circumferential direction.

The center bottom part of the anti-leakage part may include a bottom protrusion protruding downward, and the transfer part may include a second groove formed at the top surface of the transfer part such that the bottom protrusion is disposed in the second groove.

The suspension system may further include a washer part disposed between the damper part and the anti-leakage part, and fixing the anti-leakage part to the transfer part.

The washer part may include: a shape support part disposed against the protrusion part and configured to support a shape of the anti-leakage part; and a locking part connected to the shape support part, and disposed between the transfer part and the damper part so as to fix the anti-leakage part.

The suspension system may further include a first sealing member surrounding the damper part, and configured to seal a space formed between the locking part and the transfer part.

The first sealing member may be made of a rubber material and have an O-ring shape.

The upper fixing part may have an upper hole disposed at the bottom surface thereof, and the lower fixing part may have a lower groove formed at a position corresponding to the upper hole. The suspension system may further include a coupling member disposed in the lower groove through the upper hole and configured to couple the upper fixing part and the lower fixing part.

The upper fixing part may have an upper groove formed at the top of the upper hole, and the upper groove may have a diameter greater than a diameter of the upper hole.

The damper mount may be disposed against a bottom surface of the housing, while surrounding the transfer part.

The suspension system may further include a second sealing member installed between an outer wall of the fixing part and the inner wall of the housing while surrounding the fixing part, and configured to prevent the air leakage.

The second sealing member may be made of a rubber material and have an O-ring shape.

BRIEF DESCRIPTION OF THE DRAWINGS

The accompanying drawings, which are included to provide a further understanding of the inventive concept and are incorporated in and constitute a part of this specification, illustrate exemplary embodiments, and together with the description serve to explain the principles of the inventive concept.

DETAILED DESCRIPTION OF THE ILLUSTRATED EMBODIMENTS

Figure 1:
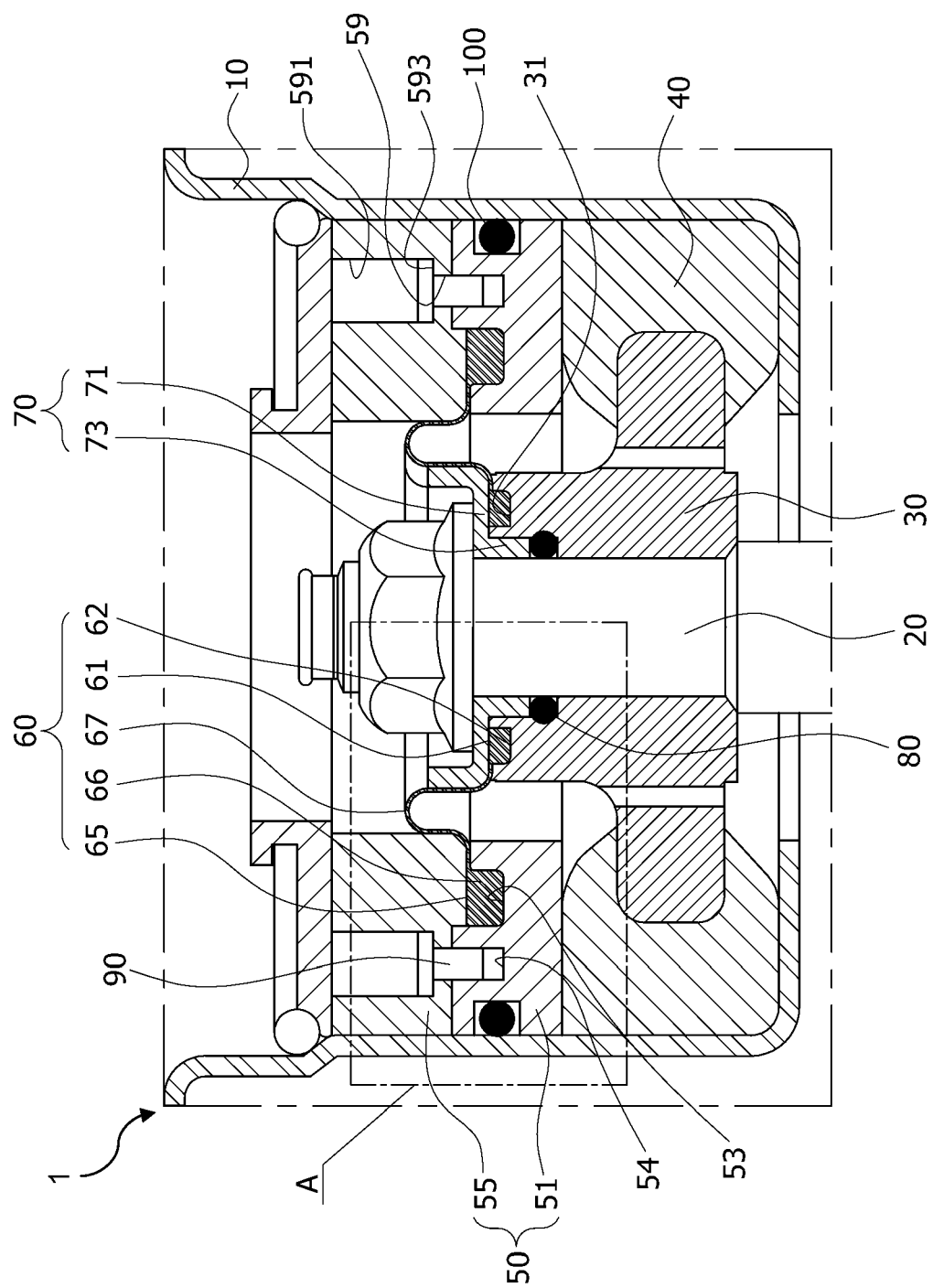
FIG. 1 is a cross-sectional view of a suspension system for a vehicle in accordance with an exemplary embodiment of the present invention.

Exemplary embodiments will hereinafter be described in detail with reference to the accompanying drawings. It should be noted that the drawings are not to precise scale and may be exaggerated in thickness of lines or sizes of components for descriptive convenience and clarity only.

Throughout the specification, like reference numerals denote like elements having the same or similar functions. Detailed description of components or functions apparent to those skilled in the art will be omitted for clarity. It should be understood that the following exemplary embodiments are provided by way of example and that the present disclosure is not limited to the exemplary embodiments disclosed herein and can be implemented in different forms by those skilled in the art. It should be noted that the drawings are not to precise scale and may be exaggerated in thickness of lines or sizes of components for descriptive convenience and clarity only.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It should be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Unless defined otherwise, it is to be understood that all the terms (including technical and scientific terms) used in the specification has the same meaning as those that are understood by those who skilled in the art. Further, the terms defined by the dictionary generally used should not be ideally or excessively formally defined unless clearly defined specifically. It will be understood that for purposes of this disclosure, "at least one of X, Y, and Z" can be construed as X only, Y only, Z only, or any combination of two or more items X, Y, and Z (e.g., XYZ, XYY, YZ, ZZ). Unless particularly described to the contrary, the term "comprise", "configure", "have", or the like, which are described herein, will be understood to imply the inclusion of the stated components, and therefore should be construed as including other components, and not the exclusion of any other elements.

In the suspension systems, an air suspension system employing an air spring may provide a more comfortable ride than a coil spring, while adjusting the vehicle height according to a driving condition of the vehicle and the characteristics of the air spring.

The air spring applied to the air suspension system typically includes a damper. The damper connects the axle and the vehicle body such that a vibration or impact transferred to the axle from the road during driving is not directly transferred to the vehicle body. Thus, the vibration or impact applied from outside is decreased.

Figure 2:
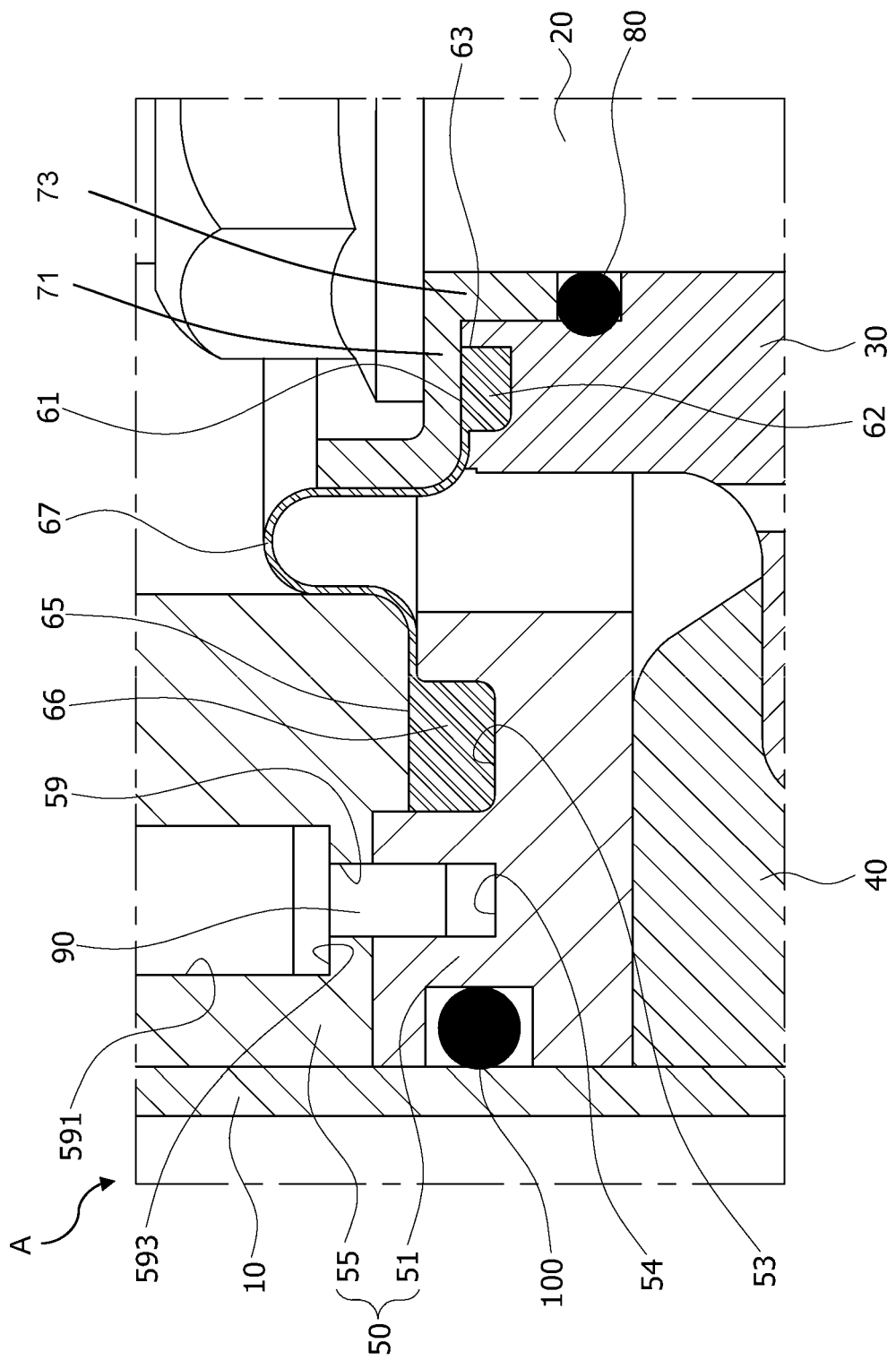
FIG. 2 is an expanded view of a portion A of FIG. 1.
Figure 3:
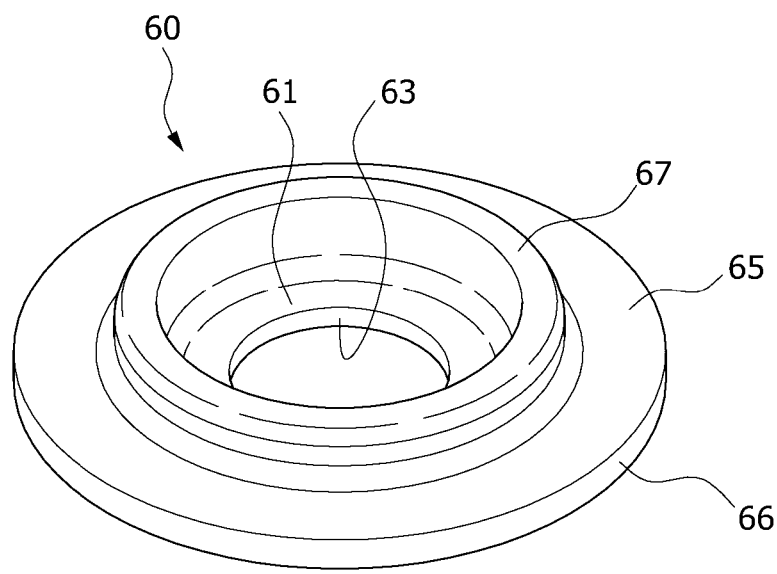
FIG. 3 is a perspective view of an anti-leakage part in accordance with the exemplary embodiment of the present invention.
Figure 4:
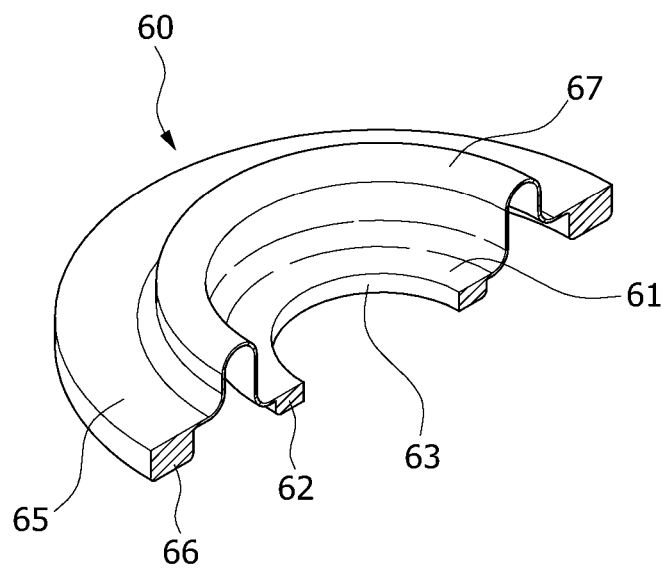
FIG. 4 is a side cross-sectional view of the anti-leakage part in accordance with the exemplary embodiment of the present invention.

FIG. 1 is a cross-sectional view of a suspension system for a vehicle in accordance with an exemplary embodiment. FIG. 2 is an expanded view of a portion A of FIG. 1. FIG. 3 is a perspective view of an anti-leakage part in accordance with an exemplary embodiment. FIG. 4 is a side cross-sectional view of the anti-leakage part in accordance with the exemplary embodiment.

Referring to FIGS. 1, 2, 3, and 4, the suspension system 1 for a vehicle in accordance with an exemplary embodiment may include a housing 10, a damper part 20, a transfer part 30, a damper mount 40, a fixing part 50, an anti-leakage part 60, a washer part 70, a first sealing member 80, a coupling member 90 and a second sealing member 100.

The housing 10 may be disposed at the upper portion of the air spring-type suspension system 1 for a vehicle, and the damper part 20 may be disposed through the housing 10. The housing 10 is disposed outside the damper part 20 such that the air of the suspension system 1 does not leak to the outside.

The damper mount 40 may be disposed on the bottom surface (with no reference numeral) of the housing 10, while surrounding the transfer part 30. Thus, the damper part 20 may primarily attenuate vibration or impact transmitted from the road surface and applied to an axle via the wheels of the vehicle during driving, and the damper mount 40 may secondarily absorb the movement and residual vibration of the damper part 20.

The damper part 20 may be disposed in the housing 10 through the housing 10. The damper part 20 may connect the vehicle body and the axle such that vibration or impact applied to the axle, via the vehicle wheels, from the road during driving is not directly transferred to the vehicle body, thereby attenuating the vibration or impact applied from outside.

The transfer part 30 may be coupled to the damper part 20 while surrounding the damper part 20, and may be made of a steel material. The transfer part 30 may transfer vibration generated during driving to the damper part 20 through the axle, and transfer the vibration which is primarily attenuated by the damper part 20, to the damper mount 40.

Since the vibration may be transferred to the damper mount 40 by the transfer part 30 and the residual vibration may be absorbed by the damper mount 40, an impact may be prevented from being directly transferred to the vehicle body and a passenger.

The transfer part 30 may have a second groove 31 formed at the top surface thereof (based on FIG. 1), such that a bottom protrusion 62 is disposed in the second groove 31. Therefore, the anti-leakage part 60 may be fixed to the transfer part 30, and prevent the internal air of the housing 10 from leaking to the outside of the anti-leakage part 60.

The damper mount 40 may be coupled to the transfer part 30, and absorb vibration of the transfer part 30 between the inner wall of the housing 10 and the transfer part 30. The damper mount 40 may be coupled to the transfer part 30 while surrounding the transfer part 30, receive vibration from the damper part 20 through the transfer part 30, the vibration being generated during driving, and absorb the residual vibration.

The damper mount 40 may be made of a urethane material such as solid Vulkollan®. The damper mount 40 may contract or expand in all directions (right, left, top, and bottom), according to the vibration of the damper part 20.

The fixing part 50 may be stacked over the damper mount 40 and disposed against the inner wall of the housing 10. The fixing part 50 may include lower fixing part 51 and upper fixing part 55.

The lower fixing part 51 may be stacked over the damper mount 40, and an end portion of the anti-leakage part 60 may be disposed on the lower fixing part 51. Thus, the lower fixing part 51 may fix the anti-leakage part 60, and prevent the internal air of the housing 10 from leaking to the outside of the anti-leakage part 60.

The upper fixing part 55 may be stacked over the lower fixing part 51 so as to fix the anti-leakage part 60, and the anti-leakage part 60 may be positioned between the upper fixing part 55 and the lower fixing part 51 such that the shape thereof is fixed and supported. Thus, the anti-leakage part 60 can prevent the internal air in the housing 10 from leaking to the outside, while enduring a high pressure in the housing 10.

The upper fixing part 55 may have an upper hole 59 formed at the bottom surface thereof (based on FIG. 1), and the lower fixing part 51 may have a lower groove 54 disposed at a position corresponding to the upper hole 59.

The anti-leakage part 60 may be coupled to the fixing part 50, and serve to prevent air from leaking between the fixing part 50 and the damper mount 40. The anti-leakage part 60 may include a center bottom part 61, an edge part 65 and a protrusion part 67.

As illustrated in FIG. 2, the center bottom part 61 may have a through-hole 63 through which the damper part 20 is passed. The center bottom part 61 may be formed as a flat surface so as to be disposed over the transfer part 30.

The center bottom part 61 may have a bottom protrusion 62 protruding downward, and the transfer part 30 may have the second groove 31 disposed at the top surface thereof, the second groove 31 corresponding to the shape of the bottom protrusion 62.

Therefore, as illustrated in FIG. 1, the bottom protrusion 62 may be disposed in the second groove 31, and prevent a side-to-side movement and separation of the anti-leakage part 60.

The edge part 65 may be disposed between the lower fixing part 51 and the upper fixing part 55 to fix the anti-leakage part 60. In addition, the edge part 65 may prevent the air in the damper mount 40 from leaking to the outside.

The edge part 65 may have an edge protrusion 66 protruding downward, and the lower fixing part 51 may have a first groove 53 formed at the top surface thereof, the first groove 53 corresponding to the shape of the edge protrusion 66.

Therefore, the edge protrusion 66 may be disposed in the first groove 53, and the upper fixing part 55 may be stacked over the edge protrusion 66. Thus, the edge protrusion 66 may be fixed between the upper fixing part 55 and the lower fixing part 51 so as not to separate from the fixing part 50.

The protrusion part 67 may connect the center bottom part 61 and the edge part 65, and protrude upward in the circumferential direction. The protrusion part 67 may prevent air from leaking through the top of the protrusion part 67, the air being in the space formed under the protrusion part 67, while enduring a high pressure.

The outer wall of the protrusion part 67 at the damper part 20 may be supported against the washer part 70, and the outer wall of the protrusion part 67 at the housing 10 may be supported against the upper fixing part 55. Thus, the anti-leakage part 60 may be fixed to the transfer part 30 and the lower fixing part 51.

In addition, the protrusion part 67 may prevent air of the damper mount 40 under the anti-leakage part 60 from leaking through the top of the anti-leakage part 60.

The washer part 70 may be disposed between the damper part 20 and the anti-leakage part 60 so as to fix the anti-leakage part 60 to the transfer part 30, and include a shape support part 71 and a locking part 73.

The shape support part 71 may be disposed against the protrusion part 67, and support the shape of the anti-leakage part 60. Thus, even though the anti-leakage part 60 is vibrated by vibration of the damper part 20, the shape support part 71 may fix the shape of the anti-leakage part 60, and prevent the anti-leakage part 60 from being damaged by a collision with the damper part 20 or another part.

The shape support part 71 may be disposed against the outer wall of the protrusion part 67 at the damper part 20, and support the shape of the anti-leakage part 60.

The locking part 73 may be connected to the shape support part 71, disposed between the transfer part 30 and the damper part 20, and the anti-leakage part 60. The inner surface of the locking part 73 may surround the damper part 20.

The locking part 73 may have a horizontal portion (with no reference number) stacked over the center bottom part 61 so as to prevent the movement of the anti-leakage part 60.

Furthermore, the locking part 73 may have a vertical portion (with no reference number) which is disposed between the transfer part 30 and the damper part 20 while surrounding the damper part 20. The vertical portion may prevent a damage caused by friction applied to the anti-leakage part 60 by the vibration of the damper part 20.

The first sealing member 80 may seal the space formed between the locking part 73 and the transfer part 30 while surrounding the damper part 20, and have an O-ring shape.

The first sealing member 80 may be made of a rubber material, and may easily deform according to the vibration of the damper part 20.

The coupling member 90 may be disposed in the lower groove 54 through the upper hole 59, and serve to couple the upper fixing part 55 and the lower fixing part 51. Thus, the upper fixing part 55 and the lower fixing part 51 may be coupled to each other.

The upper fixing part 55 has an upper groove 591 formed at the top of the upper hole 59 (based on FIG. 1), and the upper groove 591 may have a diameter greater than a diameter of the upper hole 59, such that the coupling member 90 is disposed on an upper bottom part 593 disposed between the upper hole 59 and the upper groove 591 when the coupling member 90 is disposed in the lower groove 54 through the upper hole 59.

The second sealing member 100 may be installed between the outer wall of the fixing part 50 and the inner wall of the housing 10 while surrounding the fixing part 50, in order to prevent air leakage. The second sealing member 100 may be formed in an O-ring shape, and made of a rubber material.

Hereafter, the operation principle and effect of the suspension system 1 for a vehicle in accordance with an exemplary embodiment will be described as follows.

Referring to FIGS. 1 and 2, the suspension system 1 for a vehicle in accordance with an exemplary embodiment may include the housing 10, the damper part 20, the transfer part 30, the damper mount 40, the fixing part 50, the anti-leakage part 60, the washer part 70, the first sealing member 80, the coupling member 90 and the second sealing member 100.

The damper mount 40 may be disposed at the lower portion of the housing 10 (based on FIG. 1). The damper mount 40 may be disposed against the bottom surface of the housing 10 while surrounding the transfer part 30.

Thus, when the damper part 20 is vibrated by vibration generated during driving, the vibration may be primarily attenuated by the damper part 20. As the damper part 20 in the housing 10 installed at the upper portion of the suspension system 1 is vibrated, the transfer part 30 may be vibrated, and the vibration of the transfer part 30 made of a steel material may be transferred to the damper mount 40 made of a rubber or urethane material. Then, the damper mount 40 may absorb the residual vibration, thereby minimizing vibration transferred to the vehicle body and a passenger.

In the suspension system in accordance with the exemplary embodiment, the space under the anti-leakage part 60 (based on FIG. 1) may be filled with air through the damper part 20 using an air spring.

The fixing part 50 may be stacked over the damper mount 40 and disposed against the inner wall of the housing 10, and include the lower fixing part 51 disposed over the damper mount 40 and the upper fixing part 55 stacked over the lower fixing part 51. The anti-leakage part 60 may be installed between the upper fixing part 55 and the lower fixing part 51.

The anti-leakage part 60 can prevent air leakage between the fixing part 50 and the damper mount 40.

The anti-leakage part 60 may be stacked over the damper mount 40, and a fastening member (with no reference number) such as a nut may be removed, compared to the case in which the damper mount 40 surrounding the transfer part 30 is installed at the upper portion of the housing 10, which makes it easy to disassemble and assemble the anti-leakage part 60.

Furthermore, the damper mount 40 may be disposed at the lower portion of the housing 10, or desirably disposed against the bottom surface of the housing 10 while surrounding the transfer part 30. Thus, the vibration which has been primarily attenuated by the damper part 20 may be first absorbed by the damper mount 40 before the anti-leakage part 60, which makes it possible to minimize the vibration transferred to the vehicle body and the passenger.

Referring to FIGS. 1, 2, 3 and 4, the bottom protrusion 62 disposed at the bottom of the center bottom part 61 (based on FIG. 1) may be disposed in the second groove 31 formed at the top surface of the transfer part 30. Thus, although vibration generated during driving is first transferred to the damper part 20, the position of the anti-leakage part 60 may be fixed.

The edge protrusion 66 formed at the bottom of the edge part 65 (based on FIG. 1) may be disposed in the first groove 53 formed at the top surface of the lower fixing part 51. Thus, although vibration is generated during driving is first transferred to the damper part 20, the position of the anti-leakage part 60 may be fixed.

In accordance with the exemplary embodiment, the damper mount may be disposed under the anti-leakage part, which makes it easy to disassemble and assemble the upper assembly of the suspension system.

Furthermore, the damper mount may be disposed under the anti-leakage part to primarily attenuate vibration generated during driving, and absorb residual vibration, thereby attenuating vibration transferred to the anti-leakage part.

Furthermore, the washer part may be disposed between the damper part and the anti-leakage part so as to fix the anti-leakage part, thereby preventing a separation of the anti-leakage part.

Although preferred exemplary embodiments have been disclosed for illustrative purposes, those skilled in the art will appreciate that various modifications, additions and substitutions are possible, without departing from the scope and spirit of the invention as defined in the accompanying claims.

What is claimed is:

1. A suspension system for a vehicle, comprising:
   a housing;
   a damper part disposed within the housing and to extend through the housing;
   a transfer part surrounding the damper part and coupled to the damper part;
   a damper mount coupled to the transfer part, disposed between an inner wall of the housing and the transfer part, and configured to absorb a vibration of the transfer part;
   a fixing part stacked over the damper mount and fixed to the inner wall of the housing;
   an anti-leakage part coupled to the fixing part and configured to prevent air leakage between the fixing part and the damper mount; and
   a second sealing member installed between an outer wall of the fixing part and the inner wall of the housing while surrounding the fixing part, the second sealing member being configured to prevent the air leakage.

2. The suspension system of claim 1, wherein the fixing part comprises:
   a lower fixing part stacked over the damper mount such that an end of the anti-leakage part is disposed on the lower fixing part; and
   an upper fixing part stacked over the lower fixing part so as to fix the anti-leakage part.

3. The suspension system of claim 2, wherein the anti-leakage part comprises:
   a center bottom part comprising a through-hole through which the damper part is passed, and disposed on a top of the transfer part;
   an edge part disposed between the lower fixing part and the upper fixing part; and
   a protrusion part connecting the center bottom part and the edge part, and protruding upward along a circumferential direction.

4. The suspension system of claim 3, wherein the edge part of the anti-leakage part comprises an edge protrusion protruding downward, and
   the lower fixing part comprises a first groove formed at the top surface of the lower fixing part such that the edge protrusion is disposed in the first groove.

5. The suspension system of claim 4, wherein the edge protrusion of the anti-leakage part is extended in the circumferential direction.

6. The suspension system of claim 3, wherein the center bottom part of the anti-leakage part comprises a bottom protrusion protruding downward, and
   the transfer part comprises a second groove formed at the top surface of the transfer part such that the bottom protrusion is disposed in the second groove.

7. The suspension system of claim 3, further comprising a washer part disposed between the damper part and the anti-leakage part, and fixing the anti-leakage part to the transfer part.

8. The suspension system of claim 7, wherein the washer part comprises:
   a shape support part disposed against the protrusion part and configured to support a shape of the anti-leakage part; and
   a locking part connected to the shape support part and disposed between the transfer part and the damper part so as to fix the anti-leakage part.

9. The suspension system of claim 8, further comprising a first sealing member surrounding the damper part, and configured to seal a space formed between the locking part and the transfer part.

10. The suspension system of claim 9, wherein the first sealing member is made of a rubber material and has an O-ring shape.

11. The suspension system of claim 2, wherein the upper fixing part has an upper hole formed at a bottom surface of the upper fixing part, and
the lower fixing part has a lower groove formed at a position corresponding to the upper hole,
wherein the suspension system further comprises a coupling member disposed in the lower groove through the upper hole to couple the upper fixing part and the lower fixing part.

12. The suspension system of claim 11, wherein the upper fixing part has an upper groove formed at the top of the upper hole, and the upper groove has a diameter greater than a diameter of the upper hole.

13. The suspension system of claim 1, wherein the damper mount is disposed against a bottom surface of the housing, while surrounding the transfer part.

14. The suspension system of claim 1, wherein the second sealing member is made of a rubber material and has an O-ring shape.

\* \* \* \* \*